Oct. 14, 1930.   S. F. DAVIDSON   1,778,485
ARTICLE OF FOOD AND METHOD OF MAKING
Filed Jan. 2, 1929   2 Sheets-Sheet 1
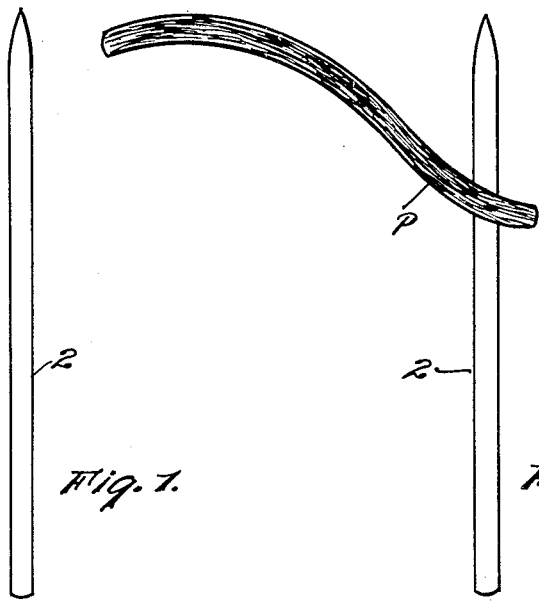
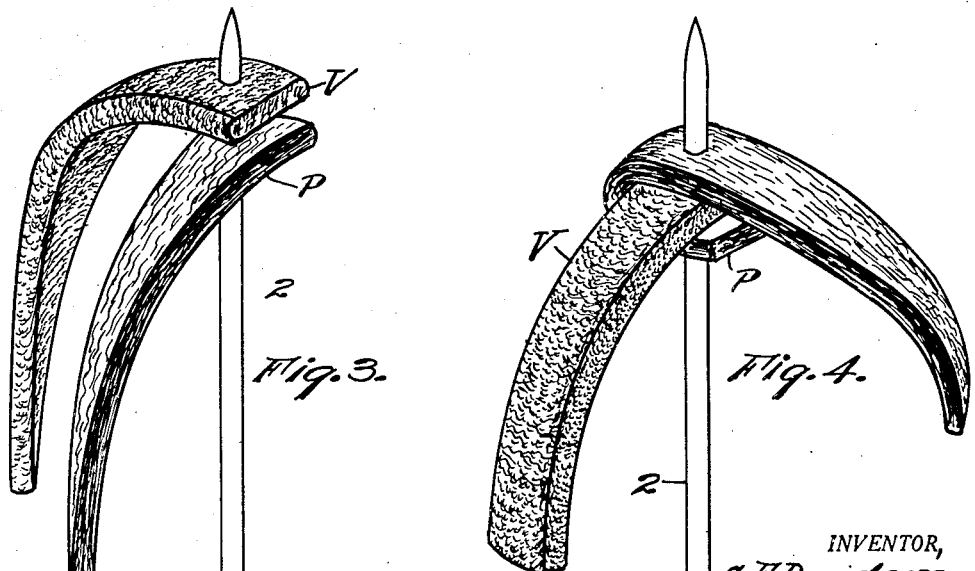
INVENTOR,
S. F. Davidson;
BY F. E. Maynard,
ATTORNEY

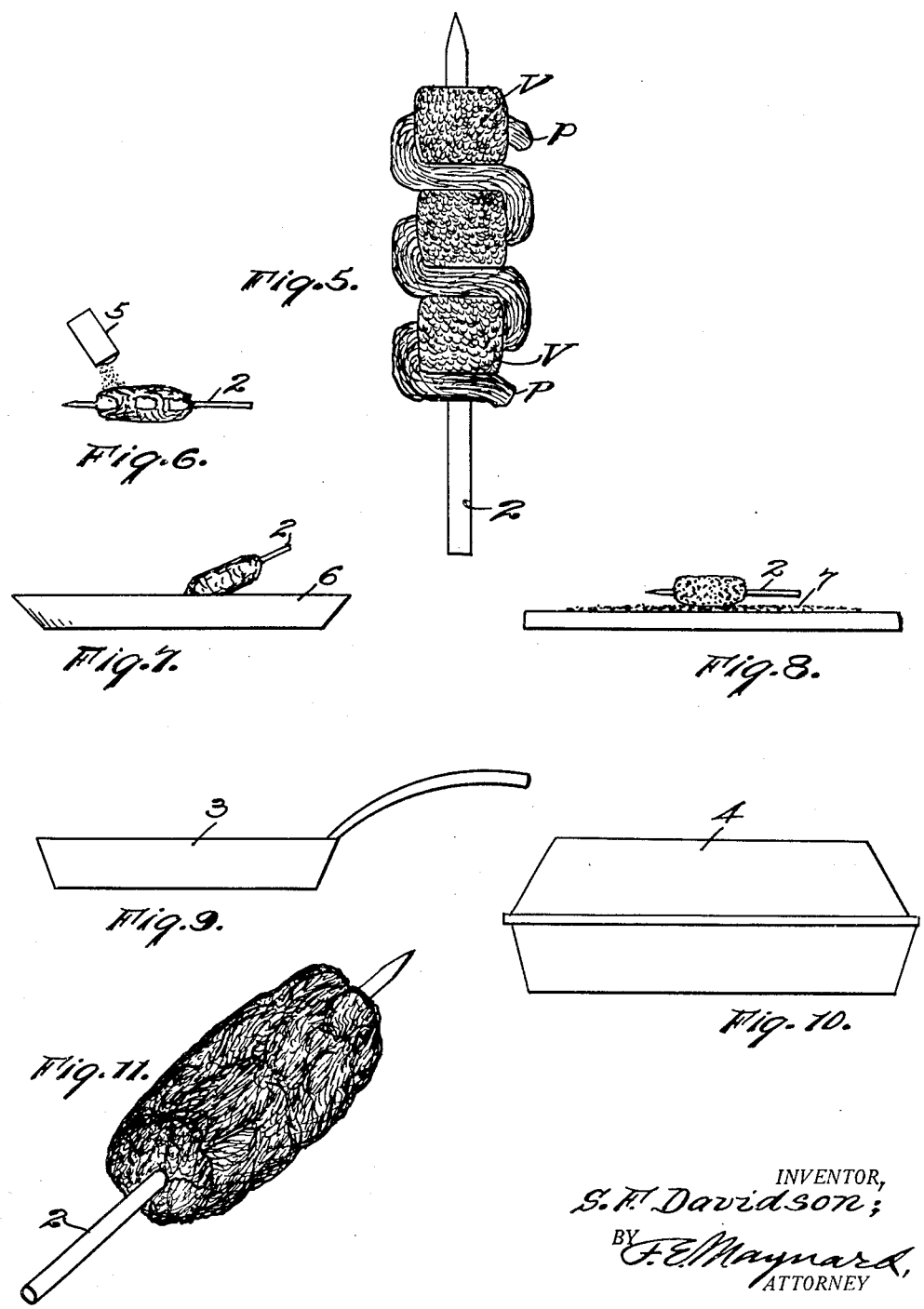

Patented Oct. 14, 1930

1,778,485

UNITED STATES PATENT OFFICE

STEVEN F. DAVIDSON, OF ORANGE, CALIFORNIA

ARTICLE OF FOOD AND METHOD OF MAKING

Application filed January 2, 1929. Serial No. 329,789.

This invention relates to an article of food and the method of making the same.

An object of the invention is to provide a most delectable, wholesome, nutritious and thoroughly cooked meat portion and one which will closely resemble the flavor of chicken.

The delicacy may well be given the name "City chicken" because it can be prepared in city butcher shops ready to be carried away and cooked elsewhere or the store or butcher shop may complete the food article by the prescribed cooking method. The finished article resembles a chicken leg in appearance.

While the article may be sold in piping hot condition at the producer's it also can be sold cold and later reheated without losing any of its flavor.

The nature of the invention and the preferred process is set forth in the ensuing description of the preferred embodiment; it being understood that modifications, variations and adaptations may be resorted to within the spirit, scope and principle of the invention as it is more directly claimed hereinafter.

Figure 1 is a plan of a sterilized, butcher's meat skewer.

Figure 2 shows the application of a strip of raw meat to the skewer.

Figure 3 shows the application of the second strip of a different kind of raw meat next to the first strip end.

Figure 4 shows the alternate impaling and zig-zag interlapping of the courses of the two strips.

Figure 5 is a side view of the fully interwoven strips.

Figure 6 shows the step of seasoning the pseudo chicken leg.

Figure 7 illustrates the step of immersing the raw meat stick in a plate of beaten egg.

Figure 8 shows the application of a coating of crumbs.

Figure 9 depicts a frying step, and
Figure 10 the roasting process.
Figure 11 illustrates the completed article.

In the present process a skewer 2 is thoroughly sterilized and on it an end of a strip P of meat, such as a piece of pork about $5'' \times 3/4'' \times 1/4''$, is impaled. Then a similarly proportioned strip V of meat, as veal, has one end impaled on the skewer and pressed close against the impaled end of the pork, at a right angle thereto.

The pork P is then pulled over the skewer and lapped close on the interposed veal V, Figure 4, and this step-by-step impaling and interlapping is continued for the full length of the meat strips, thus producing a leg-shaped body of meat on the skewer and well up from its blunt end, which serves as a handle.

A small quantity of fat is melted in a frying pan 3 and some in a roaster 4.

The raw meat body is now suitably seasoned as with salt and pepper from shakers 5 and the seasoned article is immersed in a pan 6 of beaten egg. Following this it is again seasoned.

Next the article is rolled in cracker crumbs 7 and then again dipped in the beaten egg.

It is now browned on all sides in hot fat in pan 3, and finally placed in a covered roaster 4, containing some fat, and cooked slowly in oven, from one to two hours.

It is now removed and preferably served while hot.

What is claimed is:

1. A vendable article including a skewer on which is impaled a succession of transverse layers formed of a plurality of strips of meat interlapped zig-zag fashion throughout their length; said skewer forming a handle for carrying and from which the meat is eaten directly.

2. The method of producing an article of food consisting of impaling ends of strips of meat on a skewer, then alternately impaling laps of the strips one on the other to the end of the strips, salt and pepper seasoning and coating the meat body with crumbs, and cooking the interlapped meat body.

3. The method of producing an article of food consisting of impaling strips of meat of different kinds in alternate, zig-zag laps on a skewer, seasoning the impaled mass, coating with crumbs, browning in hot fat and roasting in a slow heat.

STEVEN F. DAVIDSON.